United States Patent
Telefus, Jr.

(10) Patent No.: US 9,660,540 B2
(45) Date of Patent: May 23, 2017

(54) DIGITAL ERROR SIGNAL COMPARATOR

(71) Applicant: Flextronics AP, LLC, Broomfield, CO (US)

(72) Inventor: Mark Telefus, Jr., Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 437 days.

(21) Appl. No.: 13/669,229

(22) Filed: Nov. 5, 2012

(65) Prior Publication Data

US 2014/0125305 A1    May 8, 2014

(51) Int. Cl.
H02M 3/335    (2006.01)

(52) U.S. Cl.
CPC ... H02M 3/33515 (2013.01); H02M 3/33523 (2013.01)

(58) Field of Classification Search
CPC ............ H02M 3/139; H02M 5/25767; H02M 7/53873; H02M 3/315; H02M 3/335; H02M 3/33523; H02M 3/33507
USPC ....... 323/241, 283, 322; 363/21.01, 95, 971, 363/23, 17
See application file for complete search history.

(56) References Cited

U.S. PATENT DOCUMENTS

| | | | |
|---|---|---|---|
| 4,077,061 A | 2/1978 | Johnston | |
| 4,122,359 A | 10/1978 | Breikss | |
| 4,234,920 A | 11/1980 | VanNess | |
| 4,245,289 A | 1/1981 | Mineck | |
| 4,273,406 A | 6/1981 | Okagami | |
| 4,327,298 A | 4/1982 | Burgen | |
| 4,370,703 A | 1/1983 | Risberg | |
| 4,381,457 A | 4/1983 | Wiles | |
| 4,489,394 A | 12/1984 | Borg | |
| 4,535,410 A | 8/1985 | O'Mara | |
| 4,563,731 A | 1/1986 | Sato et al. | |
| 4,607,323 A | 8/1986 | Sokal | |
| 4,611,289 A | 9/1986 | Coppola | |
| 4,642,616 A | 2/1987 | Goodwin | |
| 4,645,278 A | 2/1987 | Yevak et al. | |
| 4,658,204 A | 4/1987 | Goodwin | |
| 4,703,191 A | 10/1987 | Ferguson | |

(Continued)

FOREIGN PATENT DOCUMENTS

| | | |
|---|---|---|
| EP | 1146630 A2 | 10/2001 |
| JP | 4217869 A | 8/1992 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Adolf Berhane
(74) *Attorney, Agent, or Firm* — Haverstock & Owens LLP

(57) ABSTRACT

A digital error feedback system, method and device adjusts the output voltage of a power converter. The digital error feedback system uses a digital comparator and one or more digital signal generators to generate and compare a digital signal corresponding to the output voltage to a reference digital signal in order to determine the current amount of error in the output voltage. The error is then able to be compensated for using a control signal generated based on the determined error.

27 Claims, 4 Drawing Sheets

(56) References Cited

U.S. PATENT DOCUMENTS

| | | |
|---|---|---|
| 4,712,160 A | 12/1987 | Sato et al. |
| 4,742,424 A | 5/1988 | Kautzer |
| 4,750,040 A | 6/1988 | Hakamada |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,884,242 A | 11/1989 | Lacy |
| 4,890,217 A | 12/1989 | Conway |
| 4,893,227 A | 1/1990 | Gallios et al. |
| 4,899,256 A | 2/1990 | Sway |
| 4,901,069 A | 2/1990 | Veneruso |
| 4,985,804 A | 1/1991 | Campbell |
| 5,065,302 A | 11/1991 | Kanazawa |
| 5,090,919 A | 2/1992 | Tsuji |
| 5,101,322 A | 3/1992 | Ghaem et al. |
| 5,105,182 A | 4/1992 | Shindo |
| 5,126,931 A | 6/1992 | Jitaru et al. |
| 5,132,890 A | 7/1992 | Blandino |
| 5,235,491 A | 8/1993 | Weiss |
| 5,266,952 A * | 11/1993 | Stone .................. H03M 1/208 341/143 |
| 5,283,792 A | 2/1994 | Davies, Jr. |
| 5,325,283 A | 6/1994 | Farrington |
| 5,365,403 A | 11/1994 | Vinciarelli et al. |
| 5,373,432 A | 12/1994 | Vollin |
| 5,434,768 A | 7/1995 | Jitaru et al. |
| 5,437,040 A | 7/1995 | Campbell |
| 5,442,540 A | 8/1995 | Hua |
| 5,459,652 A | 10/1995 | Faulk |
| 5,673,185 A | 9/1997 | Albach et al. |
| 5,712,772 A | 1/1998 | Telefus et al. |
| 5,717,936 A | 2/1998 | Uskali |
| 5,724,026 A | 3/1998 | Allen |
| 5,768,118 A | 6/1998 | Faulk et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,171 A | 11/1998 | Davis |
| 5,838,554 A | 11/1998 | Lanni |
| 5,859,771 A | 1/1999 | Kniegl |
| 5,874,841 A | 2/1999 | Majid et al. |
| 5,905,369 A | 5/1999 | Ishii et al. |
| 5,923,543 A | 7/1999 | Choi |
| 5,949,672 A | 9/1999 | Bertnet |
| 5,974,551 A | 10/1999 | Lee |
| 5,978,238 A | 11/1999 | Liu |
| 5,999,419 A | 12/1999 | Marrero |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,301,133 B1 | 10/2001 | Cuadra |
| 6,307,761 B1 | 10/2001 | Nakagawa |
| 6,323,627 B1 | 11/2001 | Schmiederer et al. |
| 6,333,650 B1 | 12/2001 | Amijn |
| 6,356,465 B2 | 3/2002 | Yasumura |
| 6,366,476 B1 | 4/2002 | Yasumura |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,466,460 B1 | 10/2002 | Rein |
| 6,480,809 B1 | 11/2002 | Slaight |
| 6,487,098 B2 | 11/2002 | Malik et al. |
| 6,535,996 B1 | 3/2003 | Brewer |
| 6,549,409 B1 | 4/2003 | Saxelby et al. |
| 6,578,253 B1 | 6/2003 | Herbert |
| 6,721,192 B1 | 4/2004 | Yang et al. |
| 6,768,222 B1 | 7/2004 | Ricks |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 7,035,126 B1 | 4/2006 | Lanni |
| 7,038,406 B2 | 5/2006 | Wilson |
| 7,061,195 B2 | 6/2006 | Ho et al. |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,215,560 B2 | 5/2007 | Soldano et al. |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,395,452 B2 | 7/2008 | Nicholson |
| 7,443,700 B2 * | 10/2008 | Yan .................. H02M 3/33515 363/21.01 |
| 7,450,388 B2 | 11/2008 | Beihoff et al. |
| 7,459,893 B2 | 12/2008 | Jacobs |
| 7,554,310 B2 * | 6/2009 | Chapuis et al. ............. 323/282 |
| 7,564,706 B1 | 7/2009 | Herbert |
| 7,579,919 B1 * | 8/2009 | Cao .............................. 331/176 |
| 7,596,007 B2 | 9/2009 | Phadke |
| 7,605,570 B2 | 10/2009 | Liu et al. |
| 7,630,221 B2 | 12/2009 | Sui et al. |
| 7,652,463 B2 | 1/2010 | Lin et al. |
| 7,679,347 B2 | 3/2010 | He |
| 7,679,938 B2 | 3/2010 | Ye et al. |
| 7,701,305 B2 | 4/2010 | Lin et al. |
| 7,830,684 B2 | 11/2010 | Taylor |
| 7,924,577 B2 | 4/2011 | Jansen et al. |
| 7,924,578 B2 | 4/2011 | Jansen et al. |
| 7,956,592 B2 * | 6/2011 | Morroni et al. ............. 323/283 |
| 7,990,122 B2 * | 8/2011 | Sase et al. .................. 323/283 |
| 8,018,743 B2 * | 9/2011 | Wang et al. ............... 363/21.18 |
| 8,049,481 B2 * | 11/2011 | Li et al. ...................... 323/283 |
| 8,059,434 B2 | 11/2011 | Huang et al. |
| 8,077,489 B2 | 12/2011 | Pellen |
| 8,094,473 B2 | 1/2012 | Moon et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,193,662 B1 | 6/2012 | Carlson |
| 8,194,417 B2 | 6/2012 | Chang |
| 8,199,541 B2 | 6/2012 | Yang |
| 8,207,717 B2 | 6/2012 | Urono et al. |
| 8,233,298 B2 | 7/2012 | Jang |
| 8,243,472 B2 | 8/2012 | Chang et al. |
| 8,344,689 B2 | 1/2013 | Boguslavskij |
| 8,363,434 B2 | 1/2013 | Lin |
| 8,369,111 B2 | 2/2013 | Balakrishnan et al. |
| 8,385,032 B1 | 2/2013 | Mao et al. |
| 8,400,801 B2 | 3/2013 | Shinoda |
| 8,410,768 B2 | 4/2013 | Huber et al. |
| 8,654,553 B1 | 2/2014 | Ye |
| 8,743,565 B2 | 6/2014 | Telefus |
| 8,749,210 B1 | 6/2014 | Nakao et al. |
| 8,767,357 B2 * | 7/2014 | Xie et al. ........................ 361/18 |
| 9,007,087 B2 | 4/2015 | Avritch |
| 9,049,028 B2 | 6/2015 | Tajima |
| 2001/0036091 A1 | 11/2001 | Yasumura |
| 2002/0008963 A1 | 1/2002 | Dibene et al. |
| 2002/0011823 A1 | 1/2002 | Lee |
| 2002/0036200 A1 | 3/2002 | Ulrich et al. |
| 2002/0121882 A1 | 9/2002 | Matsuo |
| 2003/0035303 A1 | 2/2003 | Balakrishnan et al. |
| 2003/0112645 A1 | 6/2003 | Schlecht |
| 2003/0201758 A1 | 10/2003 | Chen |
| 2004/0062061 A1 | 4/2004 | Bourdillon |
| 2004/0149551 A1 | 8/2004 | Porter |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |

(56) References Cited

U.S. PATENT DOCUMENTS

| | | |
|---|---|---|
| 2005/0117376 A1 | 6/2005 | Wilson |
| 2005/0138437 A1 | 6/2005 | Allen et al. |
| 2005/0194942 A1 | 9/2005 | Hack et al. |
| 2005/0218942 A1 | 10/2005 | Yamashita |
| 2005/0225257 A1 | 10/2005 | Green |
| 2005/0253636 A1 | 11/2005 | Yang et al. |
| 2005/0254268 A1 | 11/2005 | Reinhard et al. |
| 2005/0270001 A1 | 12/2005 | Jitaru |
| 2006/0002155 A1 | 1/2006 | Shteynberg et al. |
| 2006/0022637 A1 | 2/2006 | Wang et al. |
| 2006/0146461 A1 | 7/2006 | Jones |
| 2006/0152947 A1 | 7/2006 | Baker et al. |
| 2006/0198172 A1 | 9/2006 | Wood |
| 2006/0208711 A1 | 9/2006 | Soldano |
| 2006/0213890 A1 | 9/2006 | Kooken et al. |
| 2006/0232220 A1 | 10/2006 | Melis |
| 2007/0040516 A1 | 2/2007 | Chen |
| 2007/0067659 A1 | 3/2007 | Tevanian, Jr. |
| 2007/0120542 A1 | 5/2007 | LeMay |
| 2007/0121981 A1 | 5/2007 | Koh et al. |
| 2007/0138971 A1 | 6/2007 | Chen |
| 2007/0242487 A1 | 10/2007 | Orr |
| 2007/0247091 A1 | 10/2007 | Maiocchi |
| 2007/0263415 A1 | 11/2007 | Jansen et al. |
| 2007/0279955 A1 | 12/2007 | Liu |
| 2008/0002444 A1 | 1/2008 | Shekhawat |
| 2008/0018265 A1 | 1/2008 | Lee et al. |
| 2008/0043496 A1 | 2/2008 | Yang |
| 2008/0130322 A1 | 6/2008 | Artusi |
| 2008/0191667 A1 | 8/2008 | Kernahan et al. |
| 2008/0270809 A1 | 10/2008 | Hoffer |
| 2009/0034299 A1 | 2/2009 | Lev |
| 2009/0045889 A1 | 2/2009 | Goergen et al. |
| 2009/0089604 A1 | 4/2009 | Malik |
| 2009/0147547 A1 | 6/2009 | Yamashita |
| 2009/0168472 A1 | 7/2009 | Chung |
| 2009/0196073 A1 | 8/2009 | Nakahori |
| 2009/0207637 A1 | 8/2009 | Boeke |
| 2009/0230929 A1 | 9/2009 | Sui et al. |
| 2009/0290384 A1 | 11/2009 | Jungreis |
| 2009/0300400 A1 | 12/2009 | DuBose |
| 2010/0039833 A1 | 2/2010 | Coulson et al. |
| 2010/0103711 A1 | 4/2010 | Komatsuzaki |
| 2010/0110732 A1 | 5/2010 | Moyer |
| 2010/0115150 A1 | 5/2010 | Hachiya |
| 2010/0202161 A1 | 8/2010 | Sims et al. |
| 2010/0253310 A1 | 10/2010 | Fonderie |
| 2010/0254057 A1 | 10/2010 | Chen |
| 2010/0289466 A1 | 11/2010 | Telefus et al. |
| 2010/0317216 A1 | 12/2010 | Pocrass |
| 2010/0322441 A1 | 12/2010 | Weiss et al. |
| 2010/0332857 A1 | 12/2010 | Vogman |
| 2011/0037444 A1 | 2/2011 | Wildash |
| 2011/0112700 A1 | 5/2011 | Tajima |
| 2011/0132899 A1 | 6/2011 | Shimomugi et al. |
| 2011/0211376 A1 | 9/2011 | Hosotani |
| 2011/0213999 A1 | 9/2011 | Lecourtier |
| 2011/0215647 A1 | 9/2011 | Lecourtier |
| 2011/0222318 A1 | 9/2011 | Uno |
| 2011/0261590 A1 | 10/2011 | Liu |
| 2012/0042185 A1 | 2/2012 | Lee |
| 2012/0112657 A1 | 5/2012 | Van Der Veen et al. |
| 2012/0113686 A1 | 5/2012 | Telefus et al. |
| 2012/0113692 A1 | 5/2012 | Telefus |
| 2012/0126764 A1 | 5/2012 | Urakabe et al. |
| 2012/0144183 A1 | 6/2012 | Heinrichs |
| 2012/0153917 A1* | 6/2012 | Adell et al. .................. 323/283 |
| 2012/0235507 A1 | 9/2012 | Choi et al. |
| 2012/0268084 A1 | 10/2012 | Wang et al. |
| 2013/0003427 A1 | 1/2013 | Pan |
| 2013/0016545 A1 | 1/2013 | Xu |
| 2013/0027011 A1 | 1/2013 | Shih et al. |
| 2013/0049709 A1 | 2/2013 | Fu et al. |
| 2013/0148385 A1 | 6/2013 | Zhang |
| 2013/0155728 A1 | 6/2013 | Melanson |
| 2013/0250629 A1 | 9/2013 | Xu |
| 2013/0329469 A1 | 12/2013 | Kubota |
| 2014/0008979 A1 | 1/2014 | Kinnard |
| 2014/0153299 A1 | 6/2014 | Jeong et al. |
| 2014/0211515 A1 | 7/2014 | Sokal |
| 2015/0002108 A1 | 1/2015 | Kim |
| 2015/0052390 A1 | 2/2015 | Dryer |

FOREIGN PATENT DOCUMENTS

| | | |
|---|---|---|
| JP | 10243640 A | 9/1998 |
| JP | 2000083374 A | 3/2000 |
| JP | 20000253648 A | 9/2000 |
| JP | 2004208357 A | 7/2004 |

OTHER PUBLICATIONS

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

Non-Final Office Action mailed Jul. 12, 2016. U.S. Appl. No. 13/924,402, filed Jun. 21, 2013, Art Unit: 2838, 12 pages.

Non-Final Office Action mailed Jul. 21, 2016. U.S. Appl. No. 13/924,388, filed Jun. 21, 2013, Art Unit; 2838, 16 pages.

* cited by examiner

DIGITAL ERROR SIGNAL COMPARATOR

FIELD OF THE INVENTION

The present invention relates to the field of power supplies. More particularly, the present invention relates to a power converter system with a digital error feedback feature.

BACKGROUND

Power converters are devices that receive power from a power source and converter that power into an output power that is suitable for powering a load that is coupled to the power converter. To maintain a stable output power, conventional power converters include analog feedback components. These analog components measure the output voltage on the load and compare that voltage to a controlled reference voltage that is known to be at the desired voltage to determine the error or how different the actual output voltage is from the desired output voltage. The analog components then utilize this determined error to adjust the operation of the power converter to compensate for the measured error. However, these systems result from numerous drawbacks due to their use of analog feedback. In particular, the analog signals used to transmit the reference and output voltages require temperature, noise, response time and other types of compensation for the systems to operate accurately. These requirements add cost and limit the capabilities of the power converters.

SUMMARY OF THE INVENTION

A digital error feedback system, method and device adjusts the output voltage of a power converter. The digital error feedback system uses a digital comparator and one or more digital signal generators to generate and compare a digital signal corresponding to the output voltage to a reference digital signal to determine the current amount of error in the output voltage. The error is then able to be compensated for using a control signal generated based on the determined error. As a result, the digital error feedback system is able to maintain the desired output voltage without needing to incur the added expense of adjusting for the numerous problems associated with analog error feedback signals.

One aspect of the present invention is directed to a digital error feedback system. The system comprises a power supply for supplying an input power. A power converter is coupled with the power supply. The power converter produces an output voltage on a load using the input power. A first digital signal generator generates a digital reference signal which is coupled to a digital comparator. Based on the digital reference signal and a digital error signal representing the output voltage, the digital comparator produces a control signal that causes the power converter to adjust the output voltage. In some embodiments, the system further comprises a second digital signal generator coupled with the power converter and the digital comparator, wherein the second digital signal generator detects the output voltage and generates the digital error signal based on the detected output voltage level. In some embodiments, the digital comparator produces the control signal by determining a difference in frequency between the digital reference signal and the digital error signal and adjusting the control signal based on the determined difference. In some embodiments, the power converter comprises a controller wherein the digital error signal is based on a pulse width modulated converter signal output by the controller in order to produce the output voltage on the load. In some embodiments, the digital comparator produces the control signal by determining a number of cycles of the digital reference signal that occur during each high pulse of the digital error signal and adjusting the control signal based on the determined number of cycles per high pulse. In some embodiments, the frequency of the digital reference signal is associated with a desired voltage that is required by the load. In some embodiments, the first digital signal generator enables the frequency of the digital reference signal to be adjusted. In some embodiments, the first digital signal generator and the digital comparator are a part of a separate integrated circuit that is coupled with the power converter. In some embodiments, the power converter, the first digital signal generator and the digital comparator are a part of a single integrated circuit.

A second aspect of the present invention is directed to a digital error feedback device. The device comprises a power converter coupled with a power supply. The power converter produces an output voltage on a load using input power provided by the power supply. A first digital signal generator generates a digital reference signal. A digital comparator is coupled with the first digital signal generator. Based on the digital reference signal and a digital error signal representing the output voltage, the digital comparator produces a control signal that causes the power converter to adjust the output voltage. In some embodiments, the device further comprises a second digital signal generator coupled with the power converter and the digital comparator, wherein the second digital generator detects the output voltage and generates the digital error signal based on the detected output voltage level. In some embodiments, the digital comparator produces the control signal by determining the difference in frequency between the digital reference signal and the digital error signal and adjusting the control signal based on the determined difference. In some embodiments, the power converter comprises a controller and the digital error signal is based on a pulse width modulated converter signal output by the controller in order to produce the output voltage on the load. In some embodiments, the digital comparator produces the control signal by determining a number of cycles of the digital reference signal that occur during each high pulse of the digital error signal and adjusting the control signal based on the determined number of cycles per high pulse. In some embodiments, the frequency of the digital reference signal is associated with a desired voltage that is required by the load. In some embodiments, the first digital signal generator enables the frequency of the digital reference signal to be adjusted. In some embodiments, the first digital signal generator and the digital comparator are a part of a separate integrated circuit that is coupled with the power converter. In some embodiments, the power converter, the first digital signal generator and the digital comparator are a part of a single integrated circuit.

A third aspect of the present invention is directed to a method of adjusting the output voltage of a power converter using digital error feedback. The method comprises producing an output voltage on a load with a power converter using the input power of a power source. A digital reference signal is generated by a first digital signal generator. The digital reference signal and a digital error signal representing the output voltage are received by a digital comparator for producing a control signal that causes the power converter to adjust the output voltage. The control signal is adjusted in response to the digital reference signal and the digital error signal. In some embodiments, the method further comprises detecting the output voltage and generating the digital error signal with a second digital signal generator based on the detected output voltage level. In some embodiments, producing the control signal comprises determining the difference in frequency between the digital reference signal and the digital error signal and adjusting the control signal based on the determined difference. In some embodiments, the method further comprises outputting a pulse width modulated converter signal with a controller of the power converter to produce the output voltage on the load, wherein the digital error signal is based on the pulse width modulated converter signal. In some embodiments, producing the control signal comprises determining a number of cycles of the digital reference signal that occur during each high pulse of the digital error signal and adjusting the control signal based on the determined number of cycles per high pulse. In some embodiments, the method further comprises associating a frequency of the digital reference signal with a desired voltage that is required by the load. In some embodiments, the associating comprises adjusting the frequency of the digital reference signal with the first digital signal generator. In some embodiments, the first digital signal generator and the digital comparator are a part of a separate integrated circuit that is coupled with the power converter. In some embodiments, the power converter, the first digital signal generator and the digital comparator are a part of a single integrated circuit.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail. In particular, it should be noted that although the digital error feedback system, device and method is described herein in reference to input, output and reference voltages, it is understood that the system, device and method are able to similarly operate in reference to input, output and reference currents and/or voltages.

Embodiments of a digital error feedback system, method and device for adjusting the output voltage of a power converter are described herein. The digital error feedback system uses a digital comparator and one or more digital signal generators to generate and compare a digital signal corresponding to the output voltage to a reference digital signal in order to determine the current amount of error in the output voltage. The error is then able to be compensated for using a control signal generated based on the determined error. As a result, the digital error feedback system is able to maintain the desired output voltage without needing to incur the added expense of adjusting for the numerous problems associated with analog error feedback signals.

Figure 1:
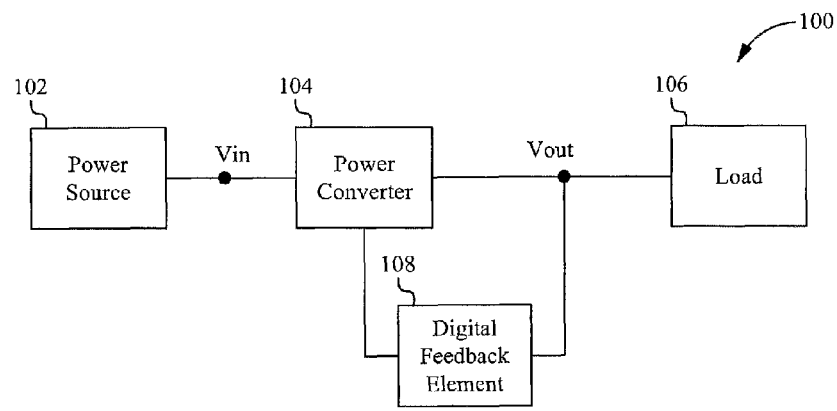
FIG. 1 illustrates a functional block diagram of a digital error feedback system according to some embodiments.

FIG. 1 illustrates a functional block diagram of a digital error feedback system 100 according to some embodiments. As shown in FIG. 1, the system 100 comprises a power source 102, a power converter 104, a load 106 and a digital feedback element 108. The power source 102 is electrically coupled with the power converter 104 which is electrically coupled with the load 106 in order to provide the output voltage $V_{out}$ to the load 106. The digital feedback element 108 is electrically coupled with the power converter 104 such that the digital feedback element 108 is able to detect the output voltage $V_{out}$ and transmit a command signal to the power converter 104. In some embodiments, two or more of the power converter 104, digital feedback element 108 and load 106 are integrated on a single integrated circuit. Alternatively, one or more of the power converter 104, digital feedback element 108 and load 106 are able to be on separate integrated circuits.

The power source 102 is able to comprise an AC power source such as a main line or plug outlet. Alternatively, the power source 102 is able to comprise a DC power supply. The power converter 104 is able to comprise a power converter circuit, such as a flyback converter. Alternatively, the power converter 104 is able to comprise other types of circuits that include power converters as are well known in the art. For example, the power converter 104 is able to comprise a forward converter, a push-pull converter, a half-bridge converter, a full-bridge converter and/or other configurations of switch mode power supplies as are well known in the art. The digital feedback element 108 is able to comprise a low power consuming voltage sensing circuit that is able to monitor the output voltage $V_{out}$, compare a digital signal associated with the output voltage $V_{out}$ to a digital reference signal and control the operation of the power converter 104 accordingly. The load 106 is able to comprise a mobile phone, laptop, set top box, television or other type of electronic device.

In operation, the power converter 104 draws power from the power source 102 and produces an output voltage $V_{out}$ that is able to be used to power the load 106. The digital feedback element 108 monitors the output voltage $V_{out}$ and compares a digital error signal associated with the output voltage $V_{out}$ with a digital reference signal associated with a desired output voltage which is determined based on the needs of the load 106. Based on this comparison of the digital error signal and the digital reference signal, the digital feedback element 108 determines the current amount of error in the output voltage $V_{out}$ (e.g. the difference between the desired output voltage and the actual output voltage) and produces a control signal for transmission to the power converter 104. In particular, the control signal is configured to cause the power converter 104 to alter operation such that the detected amount of error is compensated for and the output voltage $V_{out}$ equals the desired output voltage. In some embodiments, the digital reference signal is able to be adjusted dynamically before or during operation of the system 100 to correspond to different desired output voltages. In such embodiments, the system 100 is able to be dynamically configured to produce different output voltages $V_{out}$ as needed by different types of loads 106. As a result, the system 100 provides the advantage of enabling the use of robust digital signals to compensate for the error on the output voltage $V_{out}$ of the power converter 104 instead of relatively sensitive analog signals.

Figure 2A:
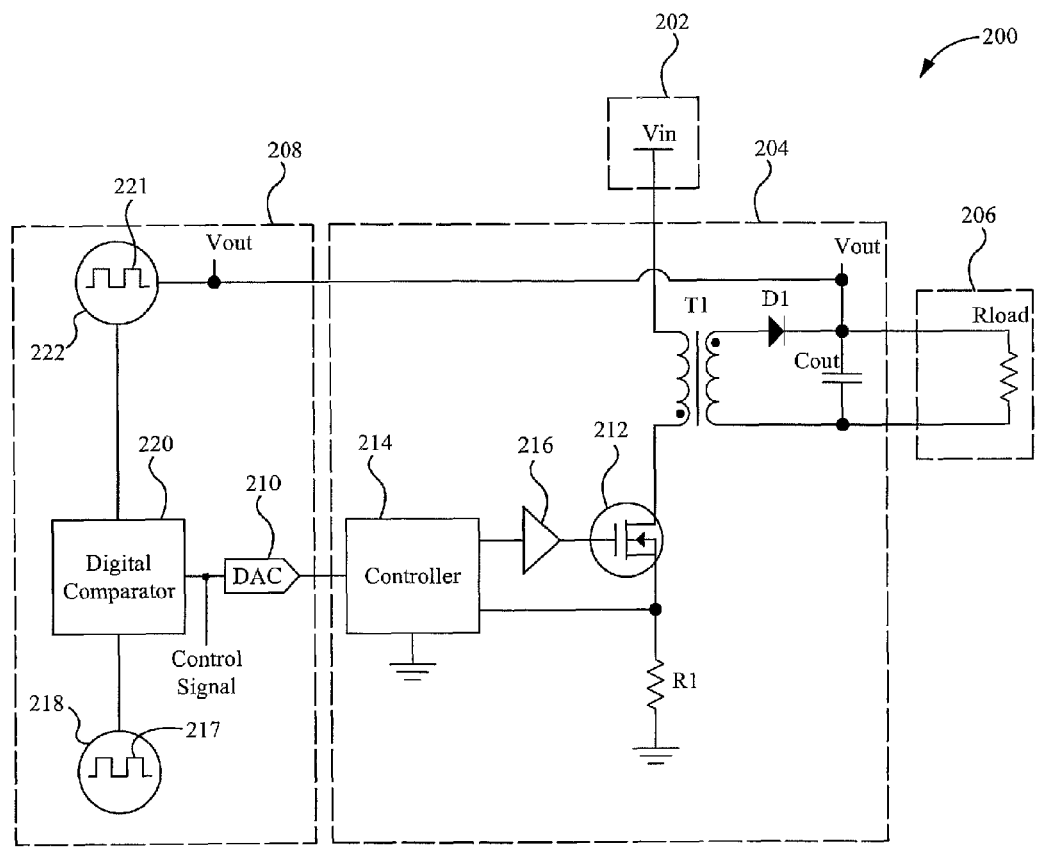
FIG. 2A illustrates a circuit diagram of the digital error feedback system according to some embodiments.

FIG. 2A illustrates a schematic diagram of a digital error feedback system 200 according to some embodiments. The schematic diagram is substantially similar to the functional block diagram shown in FIG. 1 except the additional details described herein. However, it is understood that alternative schematics are able to be used to implement the functional blocks of FIG. 2A. As shown in FIG. 2A, the digital error feedback system 200 comprises a power source 202, a power converter 204, a load 206 and a digital feedback element 208. In some embodiments, the system 200 is contained on a single integrated circuit. Alternatively, one or more of the components of the system 200 are able to be separate integrated circuits such that the system 200 is formed by multiple integrated circuits electrically coupled together.

The power source 202 comprises an input voltage $V_{in}$ that is electrically coupled to the power converter 204. The load 206 comprises a resistor $R_{load}$ that represents the resistance provided by the load 206. In particular, it is understood that the load 206 is able to comprise numerous different combination of circuitry that are able to be represented by the resistance of the resistor $R_{load}$ and the details of which are omitted for the sake of brevity. The digital feedback element 208 comprises a digital comparator 220, a first digital signal generator 218, a second digital signal generator 222 and a digital to analog converter (DAC) 210. The power converter 204 comprises a transformer T1, a transistor 212, a resistor R1, a controller device 214, a capacitor $C_{out}$, a diode D1 and a buffer 216. It is understood however, that one or more of the components of the power source 202, the power converter 204, the load 206 and/or the digital feedback element 208 are able to be positioned or duplicated on one or more of the other elements 202-208.

A primary end of the transformer T1 is electrically coupled between the input voltage $V_{in}$ and the drain terminal of the transistor 212 whose gate terminal is electrically coupled with the controller 214 via the buffer 216 and source terminal is electrically coupled with ground via the resistor R1 and with the controller 214. This enables the controller 214 to draw power into the transformer T1 by outputting a transistor drive signal to the gate terminal of the transistor 212. The secondary end of the transformer T1 is electrically coupled across the diode D1 and capacitor $C_{out}$ and the load resistance $R_{load}$ is electrically coupled across the output capacitor $C_{out}$ such that the load 206 is able to receive the output voltage $V_{out}$ on the output capacitor $C_{out}$. The second digital signal generator 222 is electrically coupled with the output capacitor $C_{out}$ and the digital comparator 220 such that the second digital signal generator 222 is able to detect the output voltage $V_{out}$ and transmit a digital feedback/error signal 221 to the digital comparator 220. The first digital signal generator 218 is also electrically coupled with the digital comparator 220 such that the first digital signal generator 218 is able to transmit a digital reference signal 217 to the digital comparator 220. The digital comparator 220 is electrically coupled with the controller 214 via the DAC 210 such that the digital comparator 220 is able to transmit a digital control signal (which is subsequently converted to an analog signal by the DAC 210) to the controller 214.

The digital comparator 220 is able to comprise one or more components and/or integrated circuits capable of comparing two or more digital signals as are well known in the art. In some embodiments, the transformer T1 is a flyback transformer. Alternatively, the transformer T1 is able to be other types of transformers or load isolating circuitry as are well known in the art. In some embodiments, the transistor 212 is a field effect transistor such as a n-type metal-oxide-semiconductor field-effect transistor (MOSFET). Alternatively, the transistor 212 is able to be other types of transistors or switching circuitry as are well known in the art. In some embodiments, the controller device 214 is a SR-NOR latch flip flop. Alternatively, the controller device 214 is able to be other types of flip flops, pulse width modulation circuits or signal logic circuitry able to regulate the duty cycle or operation of the transistor 212 as are well known in the art. In some embodiments, the first digital signal generator 218 comprises a digital clock such as the system 200 clock. Alternatively, the first digital signal generator 218 is able to comprise one or more of a digital clock, a voltage controlled oscillator and/or other electrical components capable of generating a digital reference signal as are well known in the art. In some embodiments, the second digital signal generator 222 comprises a voltage controlled oscillator. Alternatively, the second digital signal generator 222 is able to comprise one or more of a digital clock, a voltage controlled oscillator, ring oscillator, and/or other electrical components capable of generating a digital signal based on a sensed voltage as are well known in the art.

In operation, when the load 206 is coupled to the power converter 204, the controller device 214 of the power converter 204 outputs a transistor drive signal having one or more pulse cycles to the gate terminal of the transistor 212 that causes the transistor 212 to repeatedly turn on and off as the pulse cycles alternate between high and low states. As a result, power from the power source 202 is alternately drawn into the transformer T1 and discharged to the output capacitor $C_{out}$ such that the output capacitor $C_{out}$ is charged to an output voltage $V_{out}$ that is supplied to the load 206. Concurrently, the second digital signal generator 222 detects/determines the output voltage $V_{out}$ on the output capacitor $C_{out}$ and generates a digital feedback/error signal that is based on the detected/determined output voltage $V_{out}$. In particular, the digital feedback/error signal is dynamically adjusted by the second digital signal generator 222 such that the frequency of the digital feedback/error signal is corresponds to the detected/determined output voltage $V_{out}$. Similarly, the first digital signal generator 218 generates a digital reference signal having a frequency that corresponds to a desired output voltage $V_{out}$ level. In particular, the desired output voltage $V_{out}$ level and corresponding digital reference signal frequency is able to be dynamically adjusted automatically by the digital feedback element 208 based on one or more detected parameters of the load 206 and/or manually by a user adjusting or reprogramming the digital feedback element 208.

As a result, both the digital feedback/error signal and the digital reference signal are received by the digital comparator 220 such that the digital comparator 220 is able to compare the two signals in order to determine the current error in the output voltage $V_{out}$. In some embodiments, the digital comparator 220 compares the frequencies or number of pulses in a predetermined period of the two signals and determines the current error based on the detected difference in frequency or number of pulses in the period. Alternatively, other methods of comparing the digital reference and feedback/error signals are able to be used to determine the current error in the output voltage $V_{out}$ as are well known in the art. After determining the current error in the output voltage $V_{out}$, the comparator 220 generates a digital control signal that is converted to analog and transmitted to the controller 214 via the DAC 210. Alternatively, the comparator 220 is able to generate an analog control signal for direct transmission to the controller 214 such that the DAC 210 is able to be omitted. The digital control signal is generated based on the determined current error such that the digital control signal will cause the controller 214 to alter in operation in order to compensate for the detected error on the output voltage $V_{out}$ and cause the output voltage $V_{out}$ to equal the desired output voltage $V_{out}$ level. For example, in some embodiments the digital control signal is configured to cause the controller 214 to modulate the pulse width of the transistor drive signal in order to compensate for the detected current error. Alternatively, other compensation alterations are able to be made to the operation of the controller 214 as are well known in the art. This cycle of output voltage $V_{out}$ detection and correction repeats throughout the operation of the system 200 such that the output voltage is substantially maintained at the desired output voltage $V_{out}$ level. As a result, the system 200 is able to utilize digital feedback to avoid the problems with analog signal integrity while still maintaining the desired operation of the power converter 204.

Figure 2B:
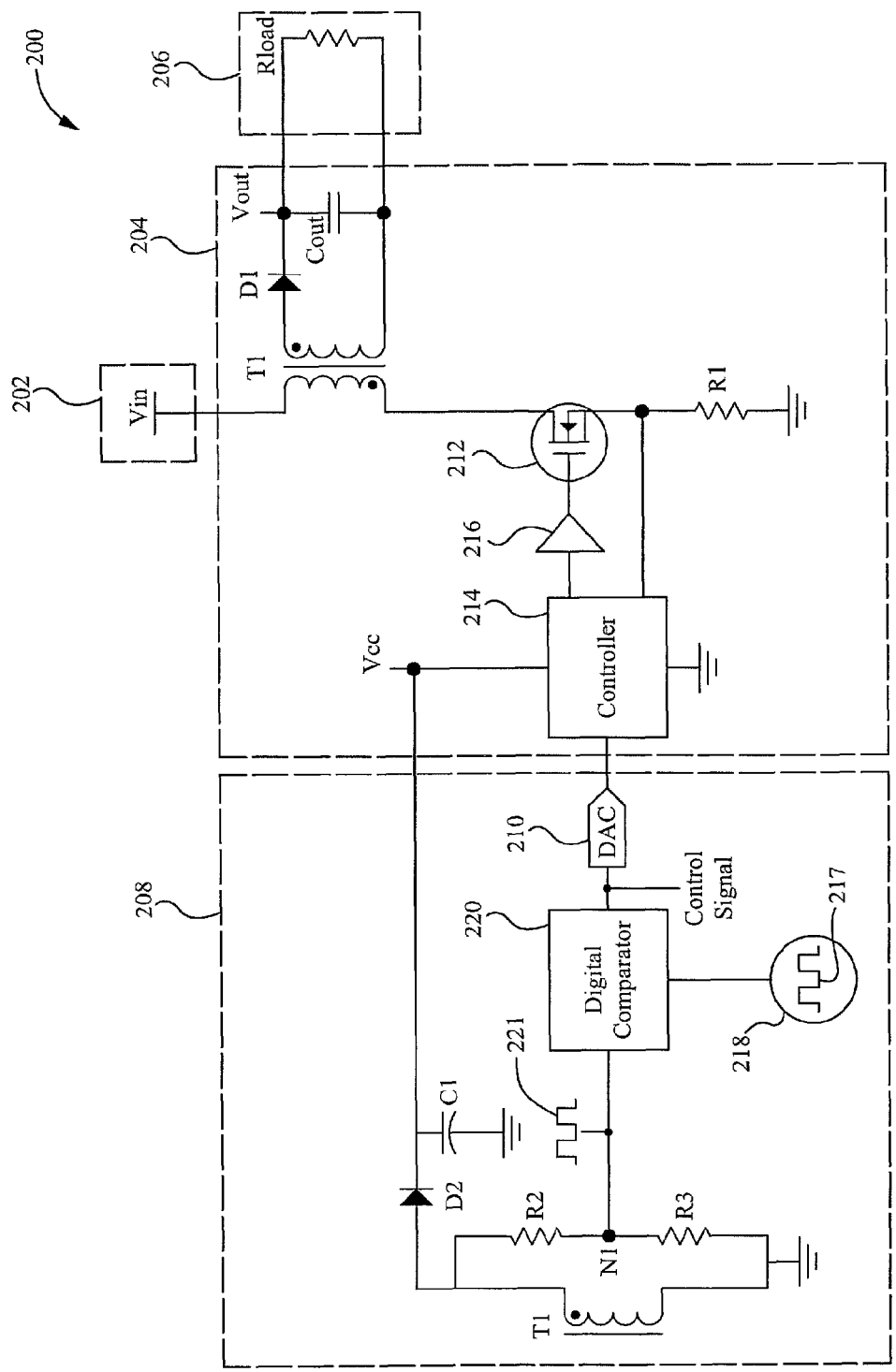
FIG. 2B illustrates an alternate circuit diagram of the digital error feedback system according to some embodiments.

FIG. 2B illustrates an alternate schematic diagram of the digital error feedback system 200 according to some embodiments. The schematic diagram is substantially similar to the schematic diagram shown in FIG. 2A except the additional details described herein. However, it is understood that alternative schematics are able to be used to implement the functional blocks of FIG. 2B. As shown in FIG. 2B, instead of the second digital signal generator 222, the digital feedback element 208 comprises a second secondary end of the transformer T1, one or more resistors R2, R3, a diode D2 and a capacitor C1. The second secondary end of the transformer T1 is electrically coupled in parallel with a pair of resistors R2, R3 between ground and the anode of the diode D2. The capacitor C1 is electrically coupled between ground and the cathode of the diode D2 which is electrically coupled with the controller 214 in order to provide recycled power $V_{cc}$ to the controller 214. The digital comparator 220 is coupled to a node N1 between the pair of resistors R2, R3 such that the digital comparator 220 is able to receive a digital feedback/error signal 221 produced on the node N1. It is understood however, that one or more of the components of the power source 202, the power converter 204, the load 206 and/or the digital feedback element 208 are able to be positioned or duplicated on one or more of the other elements 202-208.

In operation, when the load 206 is coupled to the power converter 204, the controller device 214 of the power converter 204 outputs a transistor drive signal having one or more pulse cycles to the gate terminal of the transistor 212 that causes the transistor 212 to repeatedly turn on and off as the pulse cycles alternate between high and low states. As a result, power from the power source 202 is alternately drawn into the transformer T1 and discharged to the output capacitor $C_{out}$ such that the output capacitor $C_{out}$ is charged to an output voltage $V_{out}$ that is supplied to the load 206. Additionally, a portion of the power is discharged to the capacitor C1 and the controller 214 via the diode D2. This portion of the power is able to be used/recycled by the controller 214 in order to continue to output the transistor drive signal. Concurrently, the digital comparator 220 detects/receives a pulsed or digital feedback/error signal produced on the node N1 by the switching of the transistor 212 and corresponding discharging of the portion of the power from the second secondary end of the transformer T1 to the capacitor C1 and the controller 214. Additionally, the first digital signal generator 218 generates a digital reference signal having a frequency that corresponds to a desired output voltage $V_{out}$ level. In particular, the desired output voltage $V_{out}$ level and corresponding digital reference signal frequency is able to be dynamically adjusted automatically by the digital feedback element 208 based on one or more detected parameters of the load 206 and/or manually by a user adjusting or reprogramming the digital feedback element 208.

As a result, both the digital feedback/error signal and the digital reference signal are received by the digital comparator 220 such that the digital comparator 220 is able to compare the two signals in order to determine the current error in the output voltage $V_{out}$. In some embodiments, the comparison performed by the digital comparator 220 comprises counting the number of cycles of the digital reference signal that occur while the pulsed or digital feedback/error signal is in a high state (e.g. the number of cycles per pulse of the digital feedback/error signal). Alternatively, other methods of comparing the digital reference and feedback/error signals are able to be used to determine the current error in the output voltage $V_{out}$ as are well known in the art. After determining the current error in the output voltage $V_{out}$, the comparator 220 generates a digital control signal that is converted to analog and transmitted to the controller 214 via the DAC 210. Alternatively, the comparator 220 is able to generate an analog control signal for direct transmission to the controller 214 such that the DAC 210 is able to be omitted. The digital control signal is generated based on the determined current error such that the digital control signal will cause the controller 214 to alter in operation in order to compensate for the detected error on the output voltage $V_{out}$ and cause the output voltage $V_{out}$ to equal the desired output voltage $V_{out}$ level. For example, in some embodiments the digital control signal is configured to cause the controller 214 to modulate the pulse width of the transistor drive signal in order to compensate for the detected current error. Alternatively, other compensation alterations are able to be made to the operation of the controller 214 as are well known in the art. This cycle of output voltage $V_{out}$ detection and correction repeats throughout the operation of the system 200 such that the output voltage is substantially maintained at the desired output voltage $V_{out}$ level. As a result, the system 200 is able to utilize digital feedback to avoid the problems with analog signal integrity while still maintaining the desired operation of the power converter 204.

Figure 3:
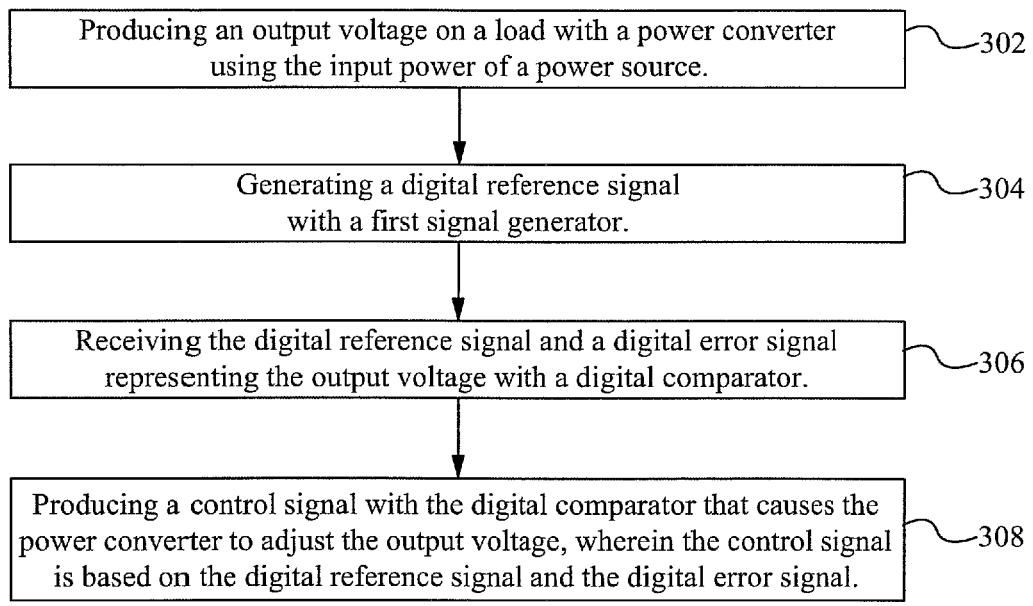
FIG. 3 illustrates a flowchart of a method of adjusting the output voltage of a power converter using digital error feedback according to some embodiments.

FIG. 3 illustrates a flow chart of a method of adjusting the output voltage of a power converter using digital error feedback according to some embodiments. At the step 302, the power converter 104 produces an output voltage $V_{out}$ on the load 106 using the input power of a power source 102. At the step 304, the first digital signal generator 218 generates a digital reference signal. At the step 306, the digital comparator 220 receives the digital reference signal and a digital feedback/error signal representing the output voltage $V_{out}$. At the step 308, the digital comparator 220 produces a control signal that causes the power converter 104 to adjust the output voltage $V_{out}$, wherein the control signal is based on the digital reference signal and the digital feedback/error signal. In some embodiments, the second digital signal generator 222 detects the output voltage $V_{out}$ and generates the digital feedback/error signal with based on the detected output voltage $V_{out}$ level. In some embodiments, the controller 214 outputs a pulse width modulated transistor drive signal in order to produce the output voltage on the load 106 and the digital error signal is based on the pulse width modulated transistor drive signal. In some embodiments, producing the control signal comprises determining the difference in frequency between the digital reference signal and the digital error signal and adjusting the control signal based on the determined difference. In some embodiments, producing the control signal comprises determining a number of cycles of the digital reference signal that occur during each high pulse of the digital feedback/error signal and adjusting the control signal based on the determined number of cycles per high pulse. Alternatively, other methods of producing the control signal that compensates for a detected error on an output voltage $V_{out}$ are able to be used as are well known in the art. In some embodiments, the method further comprises associating a frequency of the digital reference signal with a desired output voltage level that is required by the load 106, wherein the associating comprises adjusting the frequency of the digital reference signal with the first digital signal generator 218. As a result, the method provides the benefit of producing and maintaining a desired output voltage $V_{out}$ while utilizing robust digital signals as feedback instead of analog signals.

Figure 4:
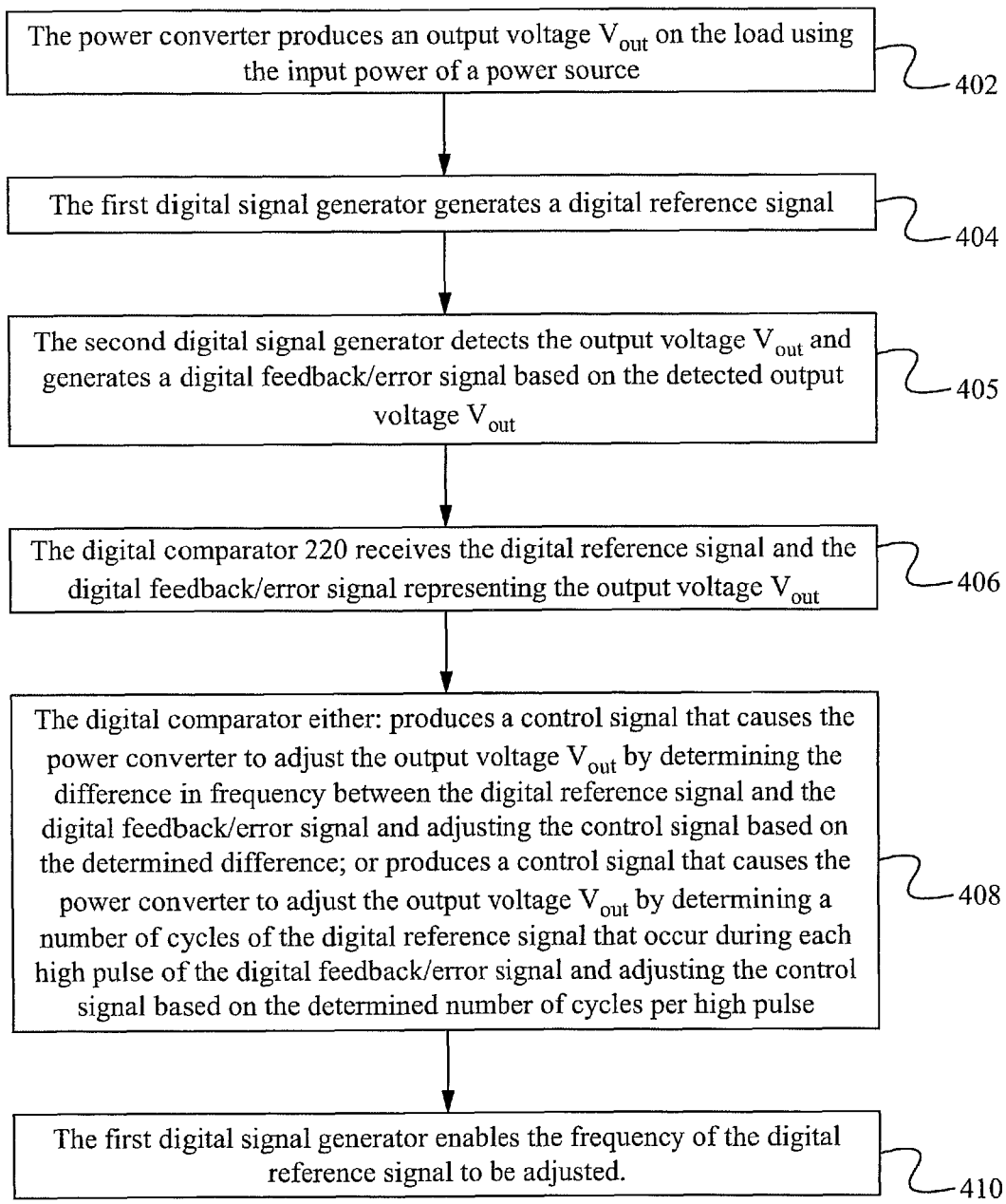
FIG. 4 illustrates a flowchart of a method of adjusting the output voltage of a power converter using digital error feedback according to some embodiments.

FIG. 4 illustrates a flow chart of a method of adjusting the output voltage of a power converter using digital error feedback according to some embodiments. At the step 402, the power converter 104 produces an output voltage $V_{out}$ on the load 106 using the input power of a power source 102. At the step 404, the first digital signal generator 218 generates a digital reference signal. At the step 405, the second digital signal generator 222 detects the output voltage $V_{out}$ and generates a digital feedback/error signal based on the detected output voltage $V_{out}$. At the step 406, the digital comparator 220 receives the digital reference signal and the digital feedback/error signal representing the output voltage $V_{out}$. At the step 408, the digital comparator 220 either: produces a control signal that causes the power converter 104 to adjust the output voltage $V_{out}$ by determining the difference in frequency between the digital reference signal and the digital feedback/error signal and adjusting the control signal based on the determined difference; or produces a control signal that causes the power converter 104 to adjust the output voltage $V_{out}$ by determining a number of cycles of the digital reference signal that occur during each high pulse of the digital feedback/error signal and adjusting the control signal based on the determined number of cycles per high pulse. Alternatively, other methods of producing the control signal that compensates for a detected error on an output voltage $V_{out}$ are able to be used as are well known in the art. At the step 410, the first digital signal generator 218 enables the frequency of the digital reference signal to be adjusted. In some embodiments, the controller 214 outputs a pulse width modulated transistor drive signal in order to produce the output voltage on the load 106 and the digital error signal is based on the pulse width modulated transistor drive signal. In some embodiments, the method further comprises associating a frequency of the digital reference signal with a desired output voltage level that is required by the load 106, wherein the associating comprises adjusting the frequency of the digital reference signal with the first digital signal generator 218. As a result, the method provides the benefit of producing and maintaining a desired output voltage $V_{out}$ while utilizing robust digital signals as feedback instead of analog signals.

Accordingly, the digital error feedback method, apparatus and system described herein has many advantages. Specifically, the system benefits from the relative robustness of digital pulse signals which enable accurate determination of error on the output voltage. Further, the system does not incur the costs associated with analog feedback such as noise suppression, temperature compensation, reference voltage control, sufficient response time, the use of tightly tolerated components and other steps necessary to maintain analog signal integrity. Accordingly, the digital error feedback method, system and apparatus described herein has numerous advantages.

The digital error feedback system has been described in terms of specific embodiments incorporating details to facilitate the understanding of the principles of construction and operation of the digital error feedback system. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiments chosen for illustration without departing from the spirit and scope of the digital error feedback system.

What is claimed is:

1. A digital error feedback system comprising:
a power supply for supplying an input power;
a power converter coupled with the power supply, wherein the power converter produces an output voltage on a load using the input power;
a digital-to-analog converter (DAC) coupled to the power converter;
a first digital signal generator that generates a digital reference signal; and
a digital comparator coupled with the first digital signal generator and the DAC, wherein, based on the digital reference signal and a frequency of a digital feedback signal representing the output voltage, the digital comparator produces a digitally compared control signal that is received by the DAC and converted to an analog signal, and further wherein the DAC transmits the analog signal to the power converter such that the digitally compared control signal, as converted to the analog signal, causes the power converter to adjust the output voltage.

2. The system of claim 1, further comprising a second digital signal generator coupled with the power converter and the digital comparator, wherein the second digital generator detects the output voltage and generates the digital feedback signal based on the detected output voltage level.

3. The system of claim 2, wherein the digital comparator produces the digitally controlled control signal by determining the difference in frequency between the digital reference signal and the digital feedback signal and adjusting the digitally compared control signal based on the determined difference.

4. The system of claim 1, wherein the power converter comprises a controller and the digital feedback signal is based on a pulse width modulated converter signal output by the controller in order to produce the output voltage on the load.

5. The system of claim 4, wherein the digital comparator produces the digitally compared control signal by determining a number of cycles of the digital reference signal that occur during each high pulse of the digital feedback signal and adjusting the digitally compared control signal based on the determined number of cycles per high pulse.

6. The system of claim 3, wherein the frequency of the digital reference signal is associated with a desired voltage that is required by the load.

7. The system of claim 6, wherein the first digital signal generator enables the frequency of the digital reference signal to be adjusted.

8. The system of claim 1, wherein the first digital signal generator and the digital comparator are a part of a separate integrated circuit that is coupled with the power converter.

9. The system of claim 1, wherein the power converter, the first digital signal generator and the digital comparator are a part of a single integrated circuit.

10. A digital error feedback device comprising:
a power converter coupled with a power supply, wherein the power converter produces an output voltage on a load using input power provided by the power supply;
a digital-to-analog converter (DAC) coupled to the power converter;
a first digital signal generator that generates a digital reference signal; and
a digital comparator coupled with the first digital signal generator and the DAC, wherein, based on the digital reference signal and a frequency of a digital feedback signal representing the output voltage, the digital comparator produces a digitally compared control signal that is received by the DAC and converted to an analog signal, and further wherein the DAC transmits the analog signal to the power converter such that the digitally compared control signal, as converted to the analog signal, causes the power converter to adjust the output voltage.

11. The device of claim 10, further comprising a second digital signal generator coupled with the power converter and the digital comparator, wherein the second digital generator detects the output voltage and generates the digital feedback signal based on the detected output voltage level.

12. The device of claim 11, wherein the digital comparator produces the digitally compared control signal by determining the difference in frequency between the digital reference signal and the digital feedback signal and adjusting the digitally compared control signal based on the determined difference.

13. The device of claim 10, wherein the power converter comprises a controller and the digital feedback signal is based on a pulse width modulated converter signal output by the controller in order to produce the output voltage on the load.

14. The device of claim 13, wherein the digital comparator produces the digitally compared control signal by determining a number of cycles of the digital reference signal that occur during each high pulse of the digital feedback signal and adjusting the digitally compared control signal based on the determined number of cycles per high pulse.

15. The device of claim 12, wherein the frequency of the digital reference signal is associated with a desired voltage that is required by the load.

16. The device of claim 15, wherein the first digital signal generator enables the frequency of the digital reference signal to be adjusted.

17. The device of claim 10, wherein the first digital signal generator and the digital comparator are a part of a separate integrated circuit that is coupled with the power converter.

18. The device of claim 10, wherein the power converter, the first digital signal generator and the digital comparator are a part of a single integrated circuit.

19. A method of adjusting the output voltage of a power converter using digital error feedback, the method comprising:
producing an output voltage on a load with a power converter using the input power of a power source;
generating a digital reference signal with a first digital signal generator;
receiving the digital reference signal and a digital feedback signal representing the output voltage with a digital comparator;
producing a digitally compared control signal with the digital comparator;
forwarding the digitally compared control signal from the digital comparator to a digital to analog converter; and
converting the digitally compared control signal to an analog signal with the digital to analog converter such that the digitally compared control signal, as converted to the analog signal, causes the power converter to adjust the output voltage, wherein the digitally compared control signal is based on the digital reference signal and a frequency of the digital feedback signal.

20. The method of claim 19, further comprising detecting the output voltage and generating the digital feedback signal with a second digital signal generator based on the detected output voltage level.

21. The method of claim 20, wherein producing the digitally compared control signal comprises determining the difference in frequency between the digital reference signal and the digital feedback signal and adjusting the digitally compared control signal based on the determined difference.

22. The method of claim 19, further comprising outputting a pulse width modulated converter signal with a controller of the power converter in order to produce the output voltage on the load, wherein the digital feedback signal is based on the pulse width modulated converter signal.

23. The method of claim 22, wherein producing the digitally compared control signal comprises determining a number of cycles of the digital reference signal that occur during each high pulse of the digital feedback signal and adjusting the digitally compared control signal based on the determined number of cycles per high pulse.

24. The method of claim 21, further comprising associating a frequency of the digital reference signal with a desired voltage that is required by the load.

25. The method of claim 24, wherein the associating comprises adjusting the frequency of the digital reference signal with the first digital signal generator.

26. The method of claim 19, wherein the first digital signal generator and the digital comparator are a part of a separate integrated circuit that is coupled with the power converter.

27. The method of claim 19, wherein the power converter, the first digital signal generator and the digital comparator are a part of a single integrated circuit.

* * * * *